United States Patent Office 3,088,927
Patented May 7, 1963

3,088,927
OIL MODIFIED ALKYD RESINS MODIFIED WITH A THERMAL POLYMER OF DICYCLOPENTADIENE
Israel J. Dissen, Chicago, Ill., assignor to Velsicol Chemical Corporation, Chicago, Ill., a corporation of Illinois
No Drawing. Filed Sept. 10, 1959, Ser. No. 839,070
9 Claims. (Cl. 260—22)

This invention relates to new oil-modified alkyd resins. In particular, this invention relates to oil-modified alkyd resins modified by the incorporation of a high melting thermal polymer of dicyclopentadiene.

Oil-modified alkyd resins have received wide acceptance in a variety of applications, notably in the field of protective coatings. In order to be of value in these applications, it is necessary that the resins exhibit superior properties such as weathering, chemical resistance, hardness, light color, and the like. For particular applications one or more of the properties will become critical.

In order to improve the properties of the oil-modified alkyd resins, various materials have been combined therewith, including various mixtures of oils, natural and synthetic resins, etc. In the area of oil-modified alkyd resins it is known to incorporate therein rosin, styrene and phenolic resins. While these resin additives have increased certain properties of the alkyd, they have not satisfied all of the problems inherent in the application of the alkyd. Thus, for example, while rosin is a relatively inexpensive additive, it produces a modified alkyd lacking to a high extent in various properties, particularly chemical resistance. The phenolics also fail in many applications to meet the necessary requisites, such as color.

Thus, it is an object of the present invention to produce oil-modified alkyd resins having superior properties.

It is another object of the present invention to prepare oil-modified alkyd resins in a commercially practical manner.

Other objects of the present invention will become apparent from the ensuing description.

Unexpectedly, it has been found that the incorporation of a thermal polymer of a cyclopentadiene into oil-modified alkyd resins produces a resinous material of unique properties by an economically practical procedure. That a combination of these two materials should be of significant value is particularly surprising in view of the fact that such cyclopentadiene polymer is not compatible with the oil-modified alkyd resin at room temperature. It is thus unusual that at higher temperatures there should be an interaction resulting in the present product.

The thermal polymer of cyclopentadiene particularly useful in the present invention is prepared by the heating of a dicyclopentadiene or a cyclopentadiene in the substantial absence of other polymerizable material to a temperature between about 500° F. and 550° F., preferably between about 510° F. and 530° F. It is not critical to the preparation of the thermal polymer as to whether a cyclopentadiene or a dicyclopentadiene is used as the starting material and therefore the monomeric and dimeric terms as used herein are in essence interchangeable. For practical reasons it is more desirable to use a dicyclopentadiene rather than the corresponding monomer. As used herein, the term "in the substantial absence of other polymerizable material" means that there is present in the reaction mixture an amount of polymerizable material in the order of that not readily separable from the dicyclopentadiene, i.e., up to about 3%, with the exception of dicyclopentadiene, methyldicyclopentadiene and dimethyldicyclopentadiene. While the methyl and dimethyl derivatives are operable in the preparation of the dicyclopentadiene polymer, it is preferred to use dicyclopentadiene or its monomer, cyclopentadiene. Since cyclopentadiene and dicyclopentadiene can be formed from each other reversibly by the use of elevated temperature, either can be used to prepare this polymer.

As is general in the preparation of polymers, this cyclopentadiene polymer is desirably performed in the presence of an inert solvent so as to allow for control of the reaction and for ease of removal of the product from the reactor. Normally the feed contains from about 40% to about 60% dicyclopentadiene and from 40 to 60% by weight of a nonpolymerizable aromatic solvent, inert to said feed, such as xylene, toluene or benzene. Larger proportions of solvent can be used, but they will tend to lengthen the reaction time and thus not be advantageous. The polymerization time will vary somewhat with the feed, exact temperature, pressure, solvent, desired end product, etc., generally between about 1 to 15 hours is sufficient to produce substantial yields of high-grade resin, it being preferred to keep the reaction time between about 2 to 5 hours. This procedure results in high resin yields, 90% and better.

Since the polymerization reaction is performed in the liquid phase at temperatures above the vaporization point of solution, it is necessary to use sufficient pressure during the reaction so as to maintain a liquid reaction mixture. In the specified temperature range and using the preferred solvents this pressure will usually be between about 200 and 300 pounds per square inch. The dicyclopentadiene resin product has a melting point between about 250° F. and 350° F., preferably between about 250° F. and 300° F.; light color (a Gardner color of less than about 13); and a molecular weight as determined by the cryoscopic method of between about 500 and 2,500, preferably around 1,000 under controlled conditions.

The following examples describe the preparation of thermal dicyclopentadiene polymer component of the present product which hereinafter will be designated "high purity dicyclopentadiene polymer."

Example 1

This example was performed using a reactor having a capacity of 5.7 gallons. The feed was composed of 50% by weight of xylene and 50% by weight of a fraction containing 92% by weight dicyclopentadiene and about 3% by weight of other polymerizables. This feed was fed into the reactor at a rate of 1.3 gallons per hour and heated therein to a temperature between 520–530° F. at 300 pounds per square inch pressure for 4½ hours, passing uniformly through the reactor for said time period. The product solution was then reduced under 30 mm. Hg and at a maximum temperature of 500° F. to remove the solvent. The product resin had a melting point of 300–330° F. and a Gardner color of 10+. The yield of product based on the dicyclopentadiene charged was 94%, 346 pounds of product.

Example 2

The same equipment and feed composite was used as in the first example. However, the feed rate was increased to about 1.9 gallons per hour, the hold time in the reactor decreased to about 3 hours, and the reaction temperature increased to 530–550° F. 105 pounds of product representing a 90% yield of the available dicyclopentadiene, having a melting point of 300–330° F. and a Gardner color of 11–12, was recovered after the reduction under 30 mm. Hg at 500° F.

Example 3

A third preparation of the valuable polymerized dicyclopentadiene resin was performed on a batch scale using a 500 ml. steel bomb equipped to withstand high pressure. The bomb was charged with a feed composed of 45% by weight of xylene and 55% by weight of a fraction containing 92% by weight of dicyclopentadiene and about 2% by weight other polymerizables. This mixture was maintained at 500° F. for 4 hours, then placed in a still and reduced under 30 mm. Hg at a maximum temperature of 490° F. The resin product thereof represented a 90.2 yield based on dicyclopentadiene charge, had a Gardner color of 9–10 and a melting point of between about 325° F. and 340° F.

As previously indicated, the present invention involves oil-modified alkyd resins containing the high purity dicyclopentadiene polymer. In general, the term oil-modified alkyd resins encompasses a wide group of materials. The three basic ingredients of course are a polyhydric alcohol, polybasic acid and a drying oil or a fatty acid. A substantial number of materials can be used in the preparation of oil-modified alkyd resins and the present invention is to be construed as inclusive thereof. Among the more predominantly used materials are the following:

Polyhydric Alcohols

| | |
|---|---|
| Glycerol | Propane triol |
| Sorbitol | Hexahydroxycyclohexane |
| Hexane triol | Propane diol |
| Mannitol | Trimethylene glycol |
| Pentaerythritol | |

Polybasic Acids (or Anhydride)

| | |
|---|---|
| Phthalic | Malic |
| Isophthalic | Fumaric |
| Tetrahydrophthalic | Sebacic |
| Terephthalic | Adipic |
| Succinic | |

Modifying Oils (or Their Fatty Acids)

| | |
|---|---|
| Tung oil | Tall oil |
| Castor oil | Soybean oil |
| Linseed oil | Cottonseed oil |

The above lists are not intended to be all-inclusive, but are believed to include a preponderance of the more important commercially used components. Often more than one member of a given type of component is used so as to obtain an alkyd resin of particular properties. The actual preparation of the standard oil-modified alkyd resins is well known to the art. Thus, for example, the oil can be reacted at an elevated temperature with the polyhydric alcohol and then the product reacted with the polybasic acid. Another method involves concomitantly reacting the fatty acid, polyhydric alcohol and polybasic acid. These oil-modified alkyd resins are commercially available.

In accordance with the present products new improved oil-modified alkyd resins of superior properties are prepared by the interaction of substantial amounts of the previously described "high purity dicyclopentadiene polymer" and the oil moiety of an oil-modified alkyd resin. As previously indicated, the dicyclopentadiene polymer is incompatible with the oil-modified alkyd resins and the oil-modifiers under room temperature, thus rendering the formation of the present product unexpected.

The present invention contemplates a product containing an oil-modified alkyd resin and from about 5 to 50% by weight of the final product of "high purity dicyclopentadiene polymer" with the exact percentage being dependent on the desired properties of the end product and with other ratios being obtainable depending upon the identity of the alkyd resin. Usually the product of the present invention will be prepared by the use of from about 20 to 40% by weight of the "high purity dicyclopentadiene polymer."

Basically, the present products are prepared by reaction of the high purity dicyclopentadiene polymer and the oil moiety of an oil-modified alkyd resin. Thus, these products can be obtained by first preparing the alkyd resin by conventional means and then reacting it with the "high purity dicyclopentadiene polymer" or by first reacting the "high purity dicyclopentadiene polymer" and the modifying oil (usually a fatty acid), followed by reaction with the polyhydric alcohol and polybasic acid components of the alkyd resin. When incorporating the polymer into the alkyd resin it is necessary to use elevated temperatures since no interaction is evidenced at room temperature. Thus, temperatures above about 400° F. are desirable for commercially acceptable yields. Since extremely high temperatures are of no apparent advantage but tend to promote the formation of color bodies, temperatures between about 450° F. and 550° F. are operable.

In accordance with the present invention it is desirable that the weight ratio of the "high purity dicyclopentadiene polymer" and the modifying oil moiety of the alkyd resin, either in combined form with the alkyd resin or prior to formation of the alkyd resin, be between about 2:1 and 1:2, it being preferred to use ratios between 2:1 and 1:1 parts by weight of the high purity dicyclopentadiene resin per part of the oil moiety. The precise ratios of components are dependent to a large extent upon the identity of the alkyd resin and the properties desired for the end product. As is customary in the production of oil-modified alkyd resins, it is desirable to conduct the reactions in the presence of an inert gas, such as nitrogen, so as to prevent oxidation and other possible adverse reactions.

The following examples illustrate the preparation of the present product:

Example 4

Glycerol (51 grams; 0.55 mol), phthalic anhydride (81 grams; 0.5 mol) and soybean fatty acid (141 grams; 0.5 mol) were placed in a glass reaction flask equipped with stirrer, gas inlet tube, thermometer and heating mantle. This reaction mixture was heated to and maintained at a temperature of 450° F. for about 3 hours, under a nitrogen atmosphere, at which time the product was an oil-modified alkyd resin having an acid number of 6. "High purity dicyclopentadiene polymer" (141 grams) was added to the reaction mixture which was raised to and maintained at a temperature of about 450° F. for 1½ hours with continuous stirring. The mixture was cooled to room temperature and the desired product recovered.

Example 5

Glycerol (51 grams; 0.55 mol) and soybean fatty acid (141 grams; 0.50 mol) were placed in a glass reaction flask equipped with gas inlet tube stirrer, thermometer and heating mantle. The mixture was raised to and maintained at 450° F. for about 1½ hours with continuous stirring and a nitrogen atmosphere. At that time the mixture was cooled to about room temperature and phthalic anhydride (156 grams; 0.55 mol) was added thereto. Then the reaction mixture was again raised to a temperature of 450° F. with continuous stirring and maintained there for 4 hours at which time the mixture had an acid number of 6.1. "High purity dicyclopentadiene polymer" (141 grams) was added and the mixture maintained at 450° F. for 50 minutes and then held at 500° F. for an additional 1½ hours with continuous stirring. On cooling, the desired modified alkyd resin was obtained and baked onto panels, and tin can lids were successfully fabricated therefrom.

Example 6

Glycerol (101 grams; 1.1 mol) and soybean fatty acid (282 grams; 1.0 mol) were placed in a glass reaction flask equipped with stirrer, thermometer, heating mantle and nitrogen inlet tube and were heated at a temperature of 450° F. for about 1½ hours and cooled to recover the desired monoglyceride. Monoglyceride (100 grams) and phthalic anhydride (43.4 grams) were placed in a similar flask and heated to and maintained at 450° F. for 1 hour, at which time "high purity dicyclopentadiene polymer" (52.6 grams) was added thereto. This reaction mixture was heated to and maintained at 500° F. for 2½ hours and then at 550° F. for 2 hours with continuous stirring and under a nitrogen atmosphere. Upon cooling, the desired clear resinous product was obtained. This product showing excellent fabrication characteristics when coated onto panels.

*Example 7*

Soybean fatty acid (50 grams; 0.18 mol), "high purity dicyclopentadiene polymer" (37.5 grams) and xylene (1 ml.) were placed in a glass reaction flask equipped with stirrer, nitrogen inlet tube, reflux condenser, thermometer and heating mantle and refluxed for about 2½ hours. After cooling, glycerol (17.1 grams; 0.18 mol) and phthalic anhydride (26.2 grams; 0.18 mol) were added to the reaction mixture which was then heated to and maintained at 450° F. for 2½ hours. Clear resinous product was recovered.

*Example 8*

Soybean fatty acid (50 grams; 0.18 mol), "high purity dicyclopentadiene polymer" (37.5 grams) and xylene (1 ml.) were placed in a glass reaction flask equipped with stirrer, nitrogen inlet tube, thermometer and heating mantle and heated to and maintained at 520° F. for 2½ hours. Upon cooling the reaction mixture to room temperature, glycerol (17.1 grams; 0.18 mol) and phthalic anhydride (26.2 grams; 0.18 mol) were added thereto and the temperature was then raised to 450° F. and maintained there for 4 hours with continuous stirring under nitrogen atmosphere. The desired resinous product was obtained by cooling the mixture. This product was dissolved in an equal amount by weight of xylene, baked onto panels, and fabricated onto can lids. The fabrication characteristics were excellent.

*Example 9*

Soybean oil (400.0 grams; 8 mols), glycerol (73.4 grams; 0.8 mol) was placed in a glass reaction flask equipped with stirrer, nitrogen inlet tube, thermometer and heating mantle and heated to about 390° F. at which time lead oxide (.16 gram) was added. The reaction temperature was increased to 455° F. and the mixture maintained at that temperature for 1 hour with continuous stirring under a nitrogen atmosphere. Isophthalic acid (173.0 grams; 1.0 mol) was added to the reaction mixture and the temperature raised to about 490° F. for an additional 3 hours. Upon cooling, "high purity dicyclopentadiene polymer" (42.6 grams) and xylene (10 ml.) were added. The mixture was refluxed for about 2½ hours, after which time the xylene was removed. The mixture was cooled, filtered, and the desired oil-modified alkyd resin obtained.

As previously indicated, the present products exhibit superior properties, particularly short drying time, improved hardness and chemical resistance. In order to determine the hardness of the films prepared from the present product, oil-modified alkyd resins were prepared from phthalic anhydride (1 mol), glycerol (1.075 mols) and soya fatty acid (1 mol) and "high purity dicyclopentadiene polymer" (75% by weight of the soya fatty acid) was incorporated in the alkyd resin as previously described. Iron drier was used in baking the films of this product which were found to have a Sward hardness of 75. When an alkyd resin prepared from isophthalic acid (27.1 grams) and glycerol (10.4 grams) into which "high purity dicyclopentadiene polymer" (42 grams; 67% by weight of the soybean oil) was incorporated to prepare a film with lead (0.2 grams) and cobalt (0.02 gram) driers, the film had a Sward hardness of 66. Further, the film showed superior resistance to sodium hydroxide, acetic acid, boiling water and mineral spirits.

I claim:

1. A process for the production of oil-modified alkyd resins which comprises reacting a polymer consisting substantially of polycyclopentadiene having a molecular weight of between about 500 and 2,500 prepared by heating cyclopentadiene in the substantial absence of other polymerizable material at a temperature of from about 500° F. to about 550° F. with an oil-modified alkyd resin prepared by reacting unsubstituted polyhydric alcohols containing up to 6 carbon atoms, unsubstituted polybasic acids containing up to 10 carbon atoms, and fatty acids containing from 14 to 22 carbon atoms at a temperature above about 400° F.

2. A process for the production of oil-modified alkyd resins which comprises reacting a thermal polymer of cyclopentadiene having a molecular weight between about 500 and 2,500 prepared by heating cyclopentadiene in the substantial absence of other polymerizable material at a temperature of from about 500° F. to about 550° F. with an oil-modified alkyd resin prepared by reacting unsubstituted polyhydric alcohols containing up to 6 carbon atoms, unsubstituted polybasic acids containing up to 10 carbon atoms, and fatty acids containing from 14 to 22 carbon atoms in a weight ratio from about 1:2 to about 2:1 at a temperature of from about 450° F. to about 550° F.

3. A process for the production of oil-modified alkyd resins which comprises reacting a polymer of cyclopentadiene having a molecular weight between about 500 and 2,500, prepared by heating cyclopentadiene in the substantial absence of other polymerizable material at a temperature of from about 500° F. to about 550° F. with an oil-modified alkyd resin prepared by reacting unsubstituted polyhydric alcohols containing up to 6 carbon atoms, unsubstituted polybasic acids containing up to 10 carbon atoms, and fatty acids containing from 14 to 22 carbon atoms in a weight ratio from about 1:2 to about 2:1 at a temperature above about 450° F.

4. A process for the production of oil-modified alkyd resins which comprises reacting a polymer of cyclopentadiene having a melting point of 250° F. to about 350° F. and a molecular weight between about 500 and 2,500 and prepared by heating cyclopentadiene in the substantial absence of other polymerizable material at a temperature of from about 500° F. to about 550° F. with an oil-modified alkyd resin prepared by reacting unsubstituted polyhydric alcohols containing up to 6 carbon atoms a polybasic acid containing up to 10 carbon atoms, and fatty acids containing from 14 to 22 carbon atoms at a temperature of from about 450° F. to about 550° F.

5. A process for the production of oil-modified alkyd resins characterized by the steps of reacting a thermal polymer of cyclopentadiene having a melting point of from about 250° F. to 350° F. and a molecular weight between about 500 and 2,500 prepared by heating cyclopentadiene in the substantial absence of other polymerizable material at a temperature of from about 500° F. to about 550° F. with a fatty acid containing from 14 to 22 carbon atoms, and reacting the reaction product concomitantly with an unsubstituted polyhydric alcohol containing up to 6 carbon atoms and a polybasic acid containing up to 10 carbon atoms and recovering therefrom the desired oil-modified alkyd resin.

6. A process for the production of oil-modified alkyd resins characterized by the step of reacting an oil-modified alkyd resin prepared by reacting unsubstituted polyhydric alcohols containing up to 6 carbon atoms, unsubstituted polybasic acids containing up to 10 carbon atoms, and fatty acids containing from 14 to 22 carbon atoms and a polymer of cyclopentadiene having a melting point of from about 250° F. to about 350° F. prepared by heating cyclopentadiene in the substantial absence of other polymerizable material at a temperature of from about 500° F. to about 550° F. at a temperature above about 450° F.

7. A process for the production of oil-modified resins which comprises reacting a thermal polymer of cyclopentadiene having a melting point of from about 250° F. to about 300° F. prepared by heating cyclopentadiene in the substantial absence of other polymerizable material as a temperature of from about 500° F. to about 550° F. and a molecular weight from about 500 to about 1,000 and a phthalic acid derived alkyd resin prepared from polyhydric alcohols containing up to 6 carbon atoms, phthalic acid and fatty acids containing from 14 to 22 carbon atoms at a temperature above about 450° F. in weight ratios of from about 1:2 to 1:1 parts of the thermal polymer of cyclopentadiene per parts of the phthalic acid derived alkyd resin.

8. Product of the process of claim 1.
9. Product of the process of claim 7.

References Cited in the file of this patent

UNITED STATES PATENTS

| | | |
|---|---|---|
| 2,397,240 | Butler | Mar. 26, 1946 |
| 2,619,476 | Malinowski | Nov. 25, 1952 |
| 2,677,671 | Yuska et al. | May 4, 1954 |

FOREIGN PATENTS

| | | |
|---|---|---|
| 582,778 | Canada | Sept. 8, 1959 |